No. 889,551.

PATENTED JUNE 2, 1908.

F. A. SCHANZ.
SIGHT FOR FIREARMS.
APPLICATION FILED OCT. 1, 1907.

Witnesses:
Fannie Fish
Henry J. Suhrbier.

Inventor:
Friedrich Albin Schanz
by James Goepel
Attorneys.

UNITED STATES PATENT OFFICE.

FRIEDRICH ALBIN SCHANZ, OF DRESDEN, GERMANY.

SIGHT FOR FIREARMS.

No. 889,551.  Specification of Letters Patent.  Patented June 2, 1908.

Application filed October 1, 1907. Serial No. 395,375.

*To all whom it may concern:*

Be it known that I, FRIEDRICH ALBIN SCHANZ, a citizen of the Empire of Germany, residing in Dresden, Germany, have invented certain new and useful Improvements in Sights for Firearms, of which the following is a specification.

This invention relates to sights for firearms, and particularly to mirror sighting devices. These devices have been constructed in such a manner that the image of the backsight in the mirror, which is placed at the front of the barrel, can be brought to adjoin a sight mark located on said mirror. The disadvantage of a sighting device of this character is that the marksman has to direct his attention simultaneously to two separate points, that is to say, he has to see that the upper edge of the sight mark on the mirror is in line with the target and that the edge of the image of the rear sight mark in the mirror adjoins the edge of the front sight mark.

The object of this invention is to provide a sighting device in which the marksman's attention need be directed to only a single point, and with this in view the invention aims to provide a device in which the image of the rear sight mark in the mirror is larger than the front sight mark on the mirror and adapted to be placed concentrically with respect to the same, so that said image will surround the front sight mark. The front and rear sight marks are made of contrasting colors, so that when the image of the rear sight mark is concentric with the front sight mark there is a clearly defined margin or edge around the latter, and hence the marksman no longer has to direct his attention simultaneously to two points separate in space.

Figure 1:
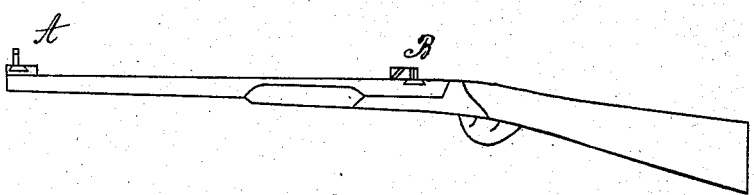
Figure 2:
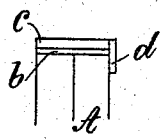
Figure 3:
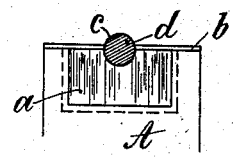
Figure 4:
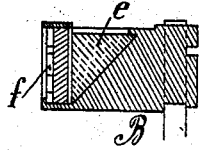
Figure 5:
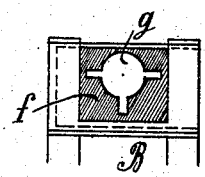
Figure 6:
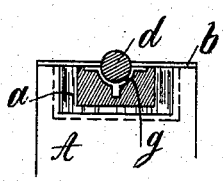
Figure 7:
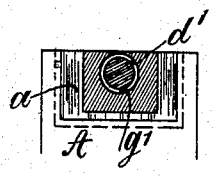
Figure 8:
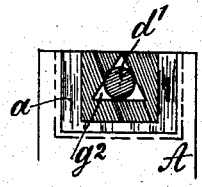

In the accompanying drawing, Figure 1 is a side-elevation of a rifle provided with a sighting device according to this invention, Figs. 2 and 3 are respectively a side-elevation of the mirror and a view as seen by the marksman, Figs. 4 and 5 are respectively a longitudinal section and front-elevation of the mark-box having the rear sight mark arranged therein, Fig. 6 shows the mirror in elevation reflecting the rear sight mark, and Figs. 7 and 8 are similar views showing modified constructions in which the front sight marks are located wholly on the mirror.

In the drawing A denotes the mirror, which is placed on the barrel at its forward end and which faces the marksman. On the face of the mirror and projecting above the same is a black disk $d$ forming the front sight mark. This disk is secured to the mirror by means of a flange $b$ extending over the top of the latter, there being a rib $c$ extending from said disk along said flange.

The mark-box B, which contains the rear sight mark, is for the most part of the usual construction. It contains a glass disk $a$, which is darkly colored, but provided with a light spot the image of which in the mirror A is adapted to be brought concentric with the disk $d$, as shown in Fig. 6. The glass disk $a$ is illuminated by means of a prism $e$. In place of this construction, the mark-box may be provided with a sheet-metal plate $f$ forming the sighting shield, this plate being provided with a light sight mark $g$, as shown in Fig. 3. When the aiming must be particularly accurate the disk-shaped field of the rear sight mark must be so large that its image in the mirror A, in spite of the perspective reduction, will surround the front sight mark with a light edge.

In Figs. 7 and 8 the front sight mark $d^1$ is located wholly on the mirror - surface, whether it is surrounded by the image $g^1$ or $g^2$ of a circular or triangular rear sight mark.

Having thus described my invention, I claim as new and desire to secure by Letters Patent:

1. A sighting device comprising a front-sight formed of a mirror having a sight mark thereon, and a rear-sight having a sight mark the image of which surrounds the front sight mark with a margin or edge.

2. A sighting device comprising a front-sight formed of a mirror having a dark sight mark thereon, and a rear-sight having a sight mark the image of which on said mirror is concentric with said front sight mark and surrounds the latter with a light margin or edge.

In testimony whereof I have signed my name to this specification in the presence of two subscribing witnesses.

FRIEDRICH ALBIN SCHANZ.

Witnesses:
 RICHARD TFFERSE,
 PAUL LIENEMERME.